Nov. 3, 1936.  H. E. MARTIN  2,059,381
TREATMENT OF SUBSTITUTION DERIVATIVES OF CELLULOSE
Filed Oct. 5, 1934
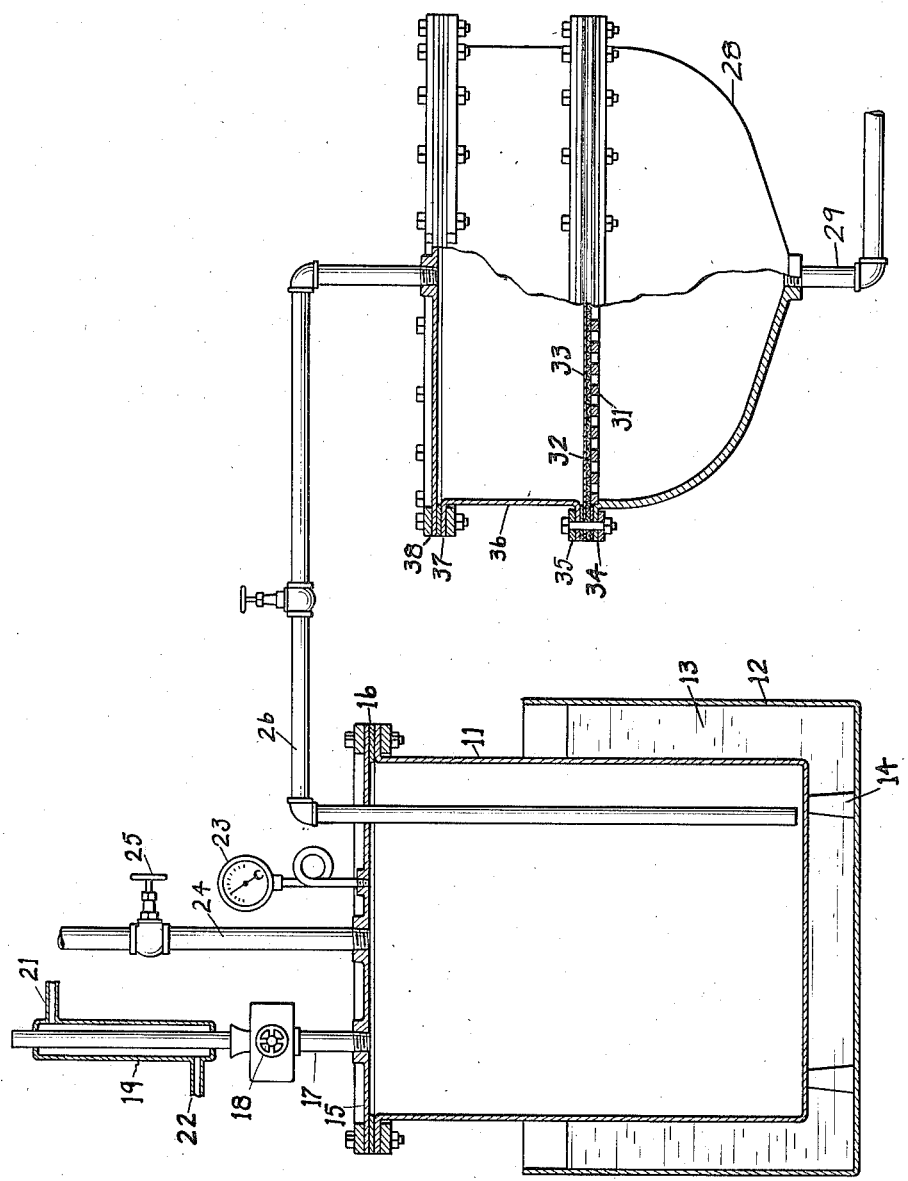
INVENTOR
HERBERT E. MARTIN
BY
ATTORNEY Patented Nov. 3, 1936

2,059,381

UNITED STATES PATENT OFFICE 2,059,381

TREATMENT OF SUBSTITUTION DERIVATIVES OF CELLULOSE

Herbert E. Martin, Cumberland, Md., assignor to Celanese Corporation of America, a corporation of Delaware Application October 5, 1934, Serial No. 747,082

4 Claims. (Cl. 260—102)

This invention relates to the treatment of derivatives of cellulose and relates more particularly to the treatment of organic derivatives of cellulose to increase their resistance to heat, to diminish their tendency to corrode metallic surfaces, to diminish their color by removal of metallic salts such as copper and iron salts and to prevent haze by removal of the haze forming compounds that are invariably found in normally prepared derivatives of cellulose.

An object of the invention is to treat derivatives of cellulose, particularly organic derivatives of cellulose, by filtering solutions of same with or without the presence of chemicals, whereby their resistance to heat is increased, their tendency to corrode metals is diminished, their color is improved and films formed therefrom are free from haze and cloudy spots. Other objects of the invention will appear from the following detailed description.

Organic derivatives of cellulose such as cellulose acetate, as ordinarily made, contain constituents, which tend to cause solutions of the same to corrode metallic surfaces, such as nickel surfaces, upon which solutions of the same are cast or extruded to make films, and also constituents that yield metallic ions in solution such as copper and iron derived from the chemicals used in the treatment of the cellulose which color the derivatives of cellulose, making them less transparent and less stable. The presence of the corroding compounds and the presence of metallic compounds in films tend to develop a deeper color and/or haze upon exposure to light and heat.

The exact chemical nature of the compounds yielding the metal ions in solution and those forming cloudy spots are not definitely known. It is known, however, that these compounds are not entirely removed, although their quantity may be greatly reduced, by chemical treatments such as bleaching, washing and chemical treatments with halide compounds, etc. If, however, the derivative of cellulose is properly filtered while in solution the metallic compounds and other cloud forming compounds are reduced to a negligible quantity such that they do not cause opaque or colored spots to develop in sheets and films of the derivative of cellulose.

According to this invention, then, derivatives of cellulose that have been sufficiently ripened and precipitated are redissolved or suspended in a solvent or liquid, treated or not treated with halide compounds and other similar reagents and filtered through such a medium that the metallic and haze forming compounds are absorbed and/or filtered from the solution. The cellulose derivative may then be reprecipitated and processed into films, slabs, sheets or filaments in the normal manner. This invention is also applicable to the treatment of ripened derivatives of cellulose that have not been precipitated from the ripening solution or that are still held in suspension in the ripening mixture. Further, this invention includes the treatment of ripened derivatives of cellulose that have been precipitated and redissolved, or derivaives of cellulose that have not been precipitated, wherein after the filtering treatment, the filament or film forming solution, i. e. the working solution, is made without substantial precipitation. Thus the filtrate is reduced in solvent content just to the point of precipitation and then rethinned, by added solvent, to the proper consistency or the plasticizer is added as the solvent is removed when forming sheets and plastic powders.

While other derivatives of cellulose, such as cellulose nitrate or nitrated cellulose acetate, may be treated in accordance with the invention, the invention is of particular applicability in the treatment of organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. Other organic derivatives of cellulose may be treated, such as crotonyl cellulose and the mixed ethers and esters of cellulose.

The derivative of cellulose that is treated according to this invention forms plastics, yarns and the like that are resistant to high temperatures, do not deteriorate upon ageing and do not develop cloudy spots or "star dust". An important application of this invention is in the treatment of cellulose acetate which is cast or extruded into sheets or foils to be used as a film base for photographic, cinematographic or especially X-ray work films and also as binding sheets for laminated shatterproof glass. Solutions of cellulose acetate that have not been treated tend to corrode the metallic surface of wheels or moving bands upon which they are extruded or cast in film making. The solutions of cellulose acetate before treatment contain metallic compounds, especially those of copper and iron, which are derived from the cotton and/or the reagents used in the acetylation and/or from contact with metallic parts of devices used in acetylation and ripening. These metallic compounds if allowed to remain with the cellulose acetate cause cloudy spots and discolored spots to be formed in the films. They also cause discoloration and unevenness of transparency in the films when the same are subjected to ageing, heat or bright light. They also contain compounds that tend to accumulate in spots or patches when the derivative of cellulose is formed into films that give to the films a cloudy or opaque blotchy appearance. By treating the cellulose acetate according to this invention, the quantity of metallic compounds and haze forming compounds in the cellulose acetate is reduced below that sufficient to form cloudy films or discolorations perceptible to the eye. Further, cellulose acetate treated according to this invention is not corrosive and does not take up metallic compound upon contact with normal processing machinery.

The derivative of cellulose employed may be an organic ester of cellulose such as cellulose acetate. The organic esters of cellulose may be formed by esterifying cellulose (wood pulp, viscose, cotton linters, cotton etc.) with an organic acid such as formic acid, or an anhydride such as acetic anhydride, propionic anhydride, etc. in the presence of a solvent for the ester formed and a catalyst. The solvent employed may be a concentrated acid corresponding to the anhydride used or it may be glacial acetic acid. Any suitable catalyst may be employed, for example, sulphuric acid, hydrochloric acid, phosphoric acid, zinc chloride and similar catalyst or mixtures of these. The cellulose to be esterified may be pretreated with an organic acid, such as formic acid and acetic acid, with or without pressure and heat, prior to being treated in the esterification mixture.

After esterification, sufficient water is added to the mixture to convert any remaining anhydride to acid and the mixture is allowed to stand, or, as commonly termed, ripened, until the desired solubility characteristics are reached. After the cellulose ester has ripened to the desired characteristics, the catalyst may be neutralized or partially neutralized and water or other non-solvent, such as benzol, may be added to precipitate the ester and the acid solution drained, washed or distilled off and recovered and rectified or purified. The ester may then be stabilized by washing with water containing a small amount of hydrochloric acid, treating with steam with or without pressure, digesting in methyl alcohol and similar liquids or by any other suitable method of stabilizing. Although these stabilizing methods remove a large quantity of unstable haze forming compounds and metallic compounds, there may be left in the material a sufficient amount of these compounds to produce cloudy or off colored films which, though they may not be detectable by the eye, produce undesired properties when employed in photographic and laminated glass work where they are subjected to great heat and strong light.

According to this invention, the precipitated cellulose may be steeped in a solution of hydrochloric acid or hydrofluoric acid or chloroform in an amount equivalent to about 2 lbs. of hydrochloric acid to 100 lbs. of cellulose ester, washed and dried. This treatment greatly reduces the quantity of metallic compounds in the material.

The fundamental part of this invention, however, is the substantially complete removal of all metallic compounds and haze forming compounds by a special filtration process. Either the precipitated ester after being redissolved, the precipitated ester that has been further treated after being redissolved or the ripened ester before precipitation is filtered and then precipitated or formed into a working solution without further precipitation. The solution of cellulose ester in a suitable solvent may be filtered through cotton wadding, cotton fabric, absorbent silica mat, carbonaceous materials or other suitable filters. The filters tend to filter out undissolved materials, that are usually small fragments of unesterified or incompletely esterified cellulose, and to absorb the metallic compounds and haze forming compounds, thus producing a filtrate of cellulose ester that, formed into films, is not sensitive to light and heat and does not develop colored or cloudy spots on exposure to same.

The preferred form of treatment is to mix thoroughly either redissolved precipitated cellulose ester or unprecipitated cellulose ester in a dilute solution with an activated carbon for from ½ to 3 hours and then filter through a filter of a crushed silica gel. By this method organic cellulose esters are purified by removing from the same substantially all of the compounds that tend to mar the transparency of films or sheets formed of the ester. The cellulose ester is also made more stable to heat and light. It is of advantage to form working solutions and plastics to be used in the formation of films, filaments, etc. before precipitating the cellulose derivative out of the filtrate. The precipitation and redissolving add to the process steps that involve the risk of contamination. A refluxing apparatus may be advantageously connected to the mixing apparatus in the event that it is found advisable to warm the solutions during mixing in order to increase the speed of solution or to be able to make a more concentrated solution by operating at a slightly higher temperature.

The precipitated ester of cellulose may be dissolved in acetone or other suitable solvent. A solution of from 2 to 20% of cellulose ester in the solvent is found to be preferable. However, other percentages may be employed depending on the type of solvent and the particular ester of cellulose employed. Examples of other suitable solvents that may be employed for various types of cellulose esters are chloroform, mixture of acetone and ethyl or methyl alcohol, ethylene dichloride, mixture of ethylene dichloride and ethyl or methyl alcohol or mixtures of methyl chloride and ethyl or methyl alcohol.

In the drawing is shown a device for carrying out the preferred form of this invention wherein 11 is a container for receiving a batch of cellulose ester dissolved in a suitable solvent to which solution has been added a small amount of activated charcoal. The container 11 may be surrounded by a heating jacket 12 suitably supplied with a heating medium 13 of sufficient temperature to bring to a boil the solution in the container 11. The container 11 may be positioned in the jacket by means of rests 14. The container may be made air tight by means of a lid 15, gaskets and fastening means 16. Positioned in the lid 15 may be a reflux column 17 having suitable valve means 18. The reflux column may be cooled by a water jacket 19 having openings 21 and 22 for circulating cold water about the reflux column. The container may be equipped with a pressure gauge 23. Connected to the container is an air line 24 equipped with a suitable valve 25. This line may be connected to a suitable source of compressed air or gas. The valve 25 is normally closed during the refluxing. To discharge the material from the container, the valve 18 is closed and the valve 25 is opened, blowing the material out of the container through the line 26 into a filtering device.

The filtering device may have a bottom receptacle 28 for catching the filtrate which may be drawn off from the bottom thereof by means of a pipe 29. Resting in a suitable seat in the bottom receptacle may be a perforated plate 31 which may be of any material sufficiently rigid to withstand the weight and pressure imposed upon it. The perforated plate is preferably covered with a wire gauze 32 and a filter cloth or paper 33. The gauze and filter cloth preferably extend beyond the circumference of the plate such that they may be bound between the flanges 34 and 35 and their accompanying gaskets preventing any movement thereof. The upper part of the filter press may be a container 36 that may be sealed gas tight by means of the flanges 35, 37 and 38 and their accompanying gaskets.

The solution of cellulose ester in a suitable solvent and mixed with activated charcoal may be blown under pressure from the container 11 to the container or filter press 36 where it is filtered through paper felt, cotton cloth, through crushed silica gel or other filtering material. In employing crushed silica gel as the filtering medium, it may be necessary to employ a light weight cotton cloth over the wire gauze and under the silica gel to prevent the same from being carried through with the filtrate.

Many modifications may be made in the device without departing from the invention.

Having described my invention, what I desire to secure by Letters Patent is:

1. Method of improving the properties of an organic acid derivative of cellulose which comprises refluxing a solution of the same with an activated carbon and filtering same through silica gel.

2. Method of improving the properties of cellulose acetate which comprises refluxing a solution of the same with an activated carbon and filtering same through silica gel.

3. Method of improving the properties of an organic acid derivative of cellulose which comprises treating a solution of the same with an activated carbon and filtering the same through silica gel.

4. Method of improving the properties of cellulose acetate which comprises treating a solution of the same with an activated carbon and filtering the same through silica gel.

HERBERT E. MARTIN.